United States Patent [19]
Aghajan et al.

[11] Patent Number: 5,418,892
[45] Date of Patent: May 23, 1995

[54] SUBSPACE-BASED LINE DETECTION

[75] Inventors: Hamid K. Aghajan; Thomas Kailath, both of Stanford, Calif.

[73] Assignee: Board of Trustees of the Leland Stanford Junior University, Palo Alto, Calif.

[21] Appl. No.: 3,255

[22] Filed: Jan. 12, 1993

[51] Int. Cl.⁶ .............................................. G06F 15/00
[52] U.S. Cl. ..................................... 395/118; 364/456
[58] Field of Search ................ 395/128, 133, 141, 142, 395/143, 118, 157, 158, 443, 449, 456

[56] References Cited

U.S. PATENT DOCUMENTS 5,282,266 1/1994 Schnaible et al. ................... 395/128

*Primary Examiner*—Phu K. Nguyen
*Attorney, Agent, or Firm*—Townsend and Townsend Khourie and Crew

[57] ABSTRACT

A new signal processing method solves the problem of fitting multiple lines in a two-dimensional image. The Subspace-Based Line Detection (SLIDE) algorithm formulates the multi-line fitting problem in a special parameter estimation framework such that a signal structure similar to the sensor array processing signal representation is obtained. Any spectral estimation method can then be exploited to obtain estimates of the line parameters. In particular, subspace-based algorithms of sensor array processing (e.g., the ESPRIT technique) can be used to produce closed-form and high resolution estimates for line parameters. The signal representation employed in this formulation can be generalized to handle both problems of line fitting (in which a set of binary-valued discrete pixels is given) and of straight edge detection (in which one starts with a grey-scale image).

5 Claims, 12 Drawing Sheets

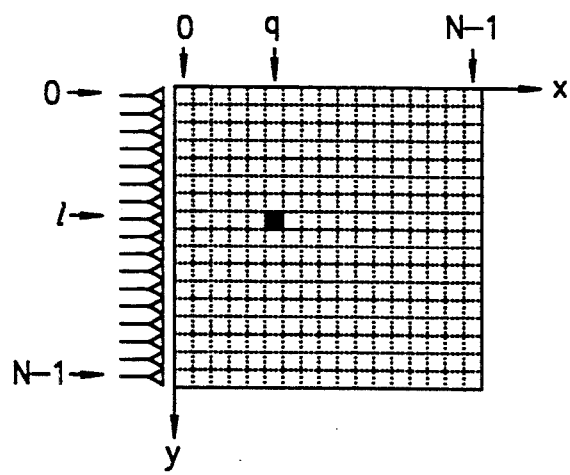 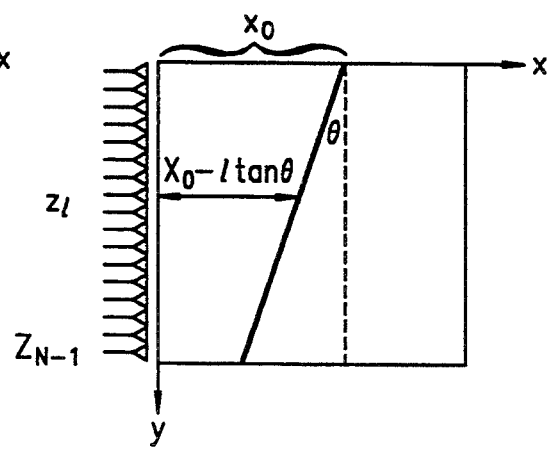
FIG. 4A  FIG. 4B
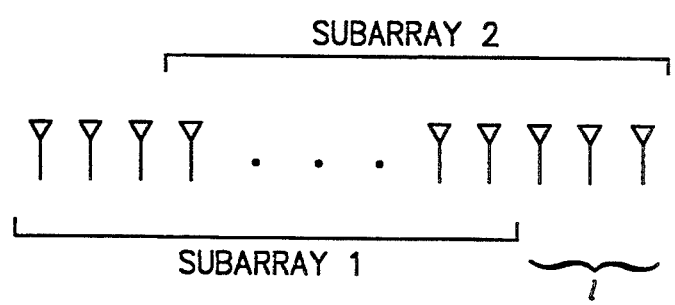
FIG. 5

//5,418,892

SUBSPACE-BASED LINE DETECTION

The invention relates generally to signal procssing for line detection, and more particularly the invention relates to fitting of multiple lines in a two-dimensional image.

BACKGROUND OF THE INVENTION

The background of the invention is described with reference to prior art publications referenced in Appendix A attached hereto.

The problem of fitting lines to a given set of data points is a well-known scientific and engineering task. In computer vision, for example, a digitized image may contain a number of discrete, '1' pixels lying on a '0' background, and the goal is the detection and parameter extraction of a number of straight lines that fit groups of collinear '1' pixels. A number of standard methods exist for such problems. Ordinary least squares methods, for example, seek to minimize the sum of squared vertical (or horizontal) distances of all points to the desired line. However, the resulting solutions are coordinate-system dependent; moreover in ordinary least squares, all measurement error is attributed to only one coordinate of the data points. To avoid these problems, the total least squares method (TLS) [1, 2] uses a criterion in which the sum of squared normal distances of all data points to the line is minimized. However, there are two major limitations that are inherited in all least squares approaches. One is the sensitivity of these methods to outliers. In other words, although the least squares methods can efficiently handle measurement errors that appear as small deviations in the point set, they cannot tolerate outliers; the existence of even a relatively small number of outliers tends to produce large residuals, leading to inadequate and unacceptable line fitting. The second main limitation of least squares methods lies in their inability to handle cases where there is more than one underlying line, especially crossing lines, in an image. The least squares method will result in an obviously wrong answer in these cases; see FIG. 1 for a simple example.

Another now classical method of finding line parameters to fit a given data point set, which is capable of handling multi-line problems, is the Hough transform [3, 4, 5], which is a special case of the Radon transform [6]. In this approach, first a special transformation is applied to all the points and then a two dimensional search is accomplished to find the maxima in the transform plane. The line parameters are $\rho$, the normal distance of the desired line from the origin, and $\theta$, the angle that the normal to the line makes with positive x-axis; $\rho$ and $\theta$ are also the coordinates in the Hough transform output plane. Each data point (x,y) is mapped under the Hough transform to the curve $$\rho = x \cos \theta + y \sin \theta$$

in the $\rho$-$\theta$ plane. This equation also represents the line in the x-y plane that has a distance $\rho$ to the origin and the normal to it makes an angle $\theta$ with the x axis. Therefore, all the points in the x-y plane located on the line $\rho_0 = x \cos \theta_0 + y \sin \theta_0$ are mapped to curves in the $\rho$-$\theta$ plane that all pass through the point $(\rho_0, \theta_0)$.

To fit a straight line to a set of data points, both $\rho$ and $\theta$ axes have to be quantized and hence a two-dimensional accumulator array be constructed in the $\rho$-$\theta$ plane. The Hough transform equation is applied to each point in the data set and the contents of all the cells in the transform plane that the corresponding curve passes through are increased by one. This is done until all the data points are transformed and then, an exhaustive search will be needed to locate a number of maxima points in the $\rho$-$\theta$ plane.

The Hough transform method is capable of handling a fairly high amount of noise contamination; however, it has certain drawbacks that may drastically limit its use. One problem, mentioned earlier, is the quantization of the $\rho$ and $\theta$ axes: to obtain an acceptable resolution, these coordinates need to be quantized finely, but reducing the quantization steps will broaden the peaks in the transform plane; in other words, since the actual measurement points for a line are not exactly collinear, the corresponding curves in the $\rho$-$\theta$ plane do not pass through the same point. Certain procedures have been investigated to compensate for this difficulty in the quantization step of the Hough transform [7, 8, 9]. Secondly the burden of the two dimensional exhaustive search in the $\rho$-$\theta$ plane for finding the maxima points is a serious drawback of the Hough transform, and this becomes more severe when the number of lines to be fitted to a given data set is unknown. In such cases, the existence of local maxima may cause the search to provide incorrect answers.

The present invention is directed to a new systematic multi-line fitting and straight edge detection procedure.

SUMMARY OF THE INVENTION

The Subspace-Based Line Detection (SLIDE) algorithm in accordance with the invention, reformulates the line parameter estimation problem into a subspace fitting framework by applying a propagation (phase-preserving projection) scheme on the image pixels. More specifically, SLIDE is based on the introduction of a perfect mathematical analogy between the problem of estimating angles of multiple lines in an image and the problem of determining the directions of arrival of planar electromagnetic waves impinging on an antenna array. Another analogy is made between the problem of estimating the offsets of the lines and the problem of time series harmonic retrieval. The direction-of-arrival estimation and the harmonic retrieval problems have been extensively studied, e.g. for radar and sonar applications and time series analysis, and in particular, in the last decade several so called super-resolution algorithms (see [10],[11],[12],[13]) have been developed. In the line fitting problem, it is shown that the conditions for using a certain computationally efficient (ESPRIT) algorithm are met. We will introduce these analogies by adopting two signal generation scenarios from the image pixels that we call the constant-$\mu$ propagation for line angle estimation, and the variable-$\tau$ propagation for line offset estimation. Another particularly appealing benefit of the analogy is that an efficient statistical technique from the field of sensor array processing can be used to provide an objective estimate of the number of lines in an image.

SLIDE yields closed-form and high resolution estimates of the line parameters, as opposed to the standard method of Hough transform in which the line parameters are subject to limited resolution due to the chosen bin sizes and are found by implementing a search procedure. Computational complexity of SLIDE is an order of magnitude less than that of the Hough transform method. Also SLIDE does not require a large memory space, whereas the Hough transform method needs a large space to store the output grid values.

In the new approach, estimation of line parameters is accomplished in two phases. First, the directions (or angles) of the lines are estimated and then estimates of the offsets are obtained. There exist important applications where only the line orientations are of concern. For example, when an autonomous vehicle is programed to follow a road, the scene that its camera pictures includes primarily (after preprocessing,) some '1' pixels representing the two sides of the road, as in FIG. 2(a), for example. By determining the orientations of these two lines, the vehicle can decide on its next movement. As another application, one can mention the task of precise rotational alignment of wafer and mask in microlithography for VLSI fabrication. In fact, it was the latter problem that inspired the present work. An example of a preprocessed picture from lithography is shown in FIG. 2(b).

We can now introduce a new formalism for the multiple line angle estimation problem that casts this problem into the general framework of array processing problems.

BRIEF DESCRIPTION OF THE DRAWINGS

FIG. 2(a) is a typical scene pictured by an autonomous vehicle commanded to move along a road where by estimating the direction of the road sides, the vehicle decides on its next movement; and FIG. 2(b) illustrates, in precision wafer-mask rotational alignment, the direction of the feature-lines on the wafer is to be estimated.

FIG. 4(a) illustrates the image matrix and the hypothetical sensors located along the y-axis, and FIG. 4(b) illustrates measured signal at the $l^{th}$ receiver due to a single line.

FIG. 5 illustrates an overlapped subarray configuration in a uniform linear array, the subarray separation $\Delta$, equal to 1 times the element spacing.

DETAILED DESCRIPTION OF ILLUSTRATIVE EMBODIMENTS

Estimation of Line Angles

Figure 1:
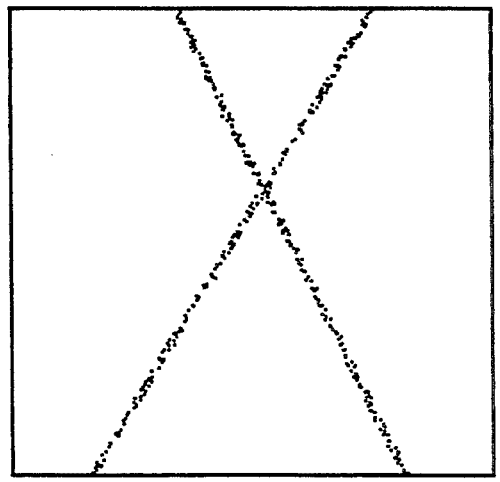
FIG. 1 illustrates an example of line fitting where the least squares method results in a wrong answer.
Figure 2A:
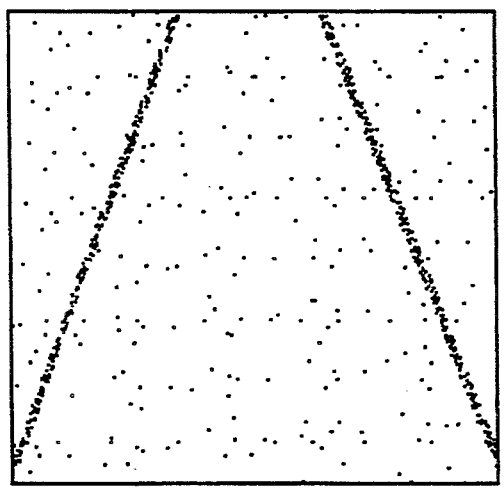
FIGS. 2(a) and 2(b) illustrate two examples of practical use in which only the orientation of the lines is of concern.
Figure 2B:
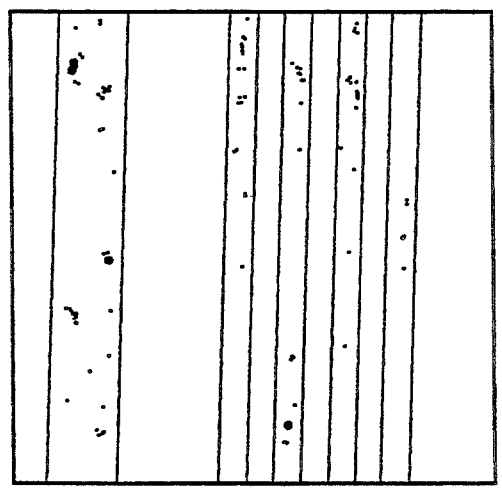
Figure 3:
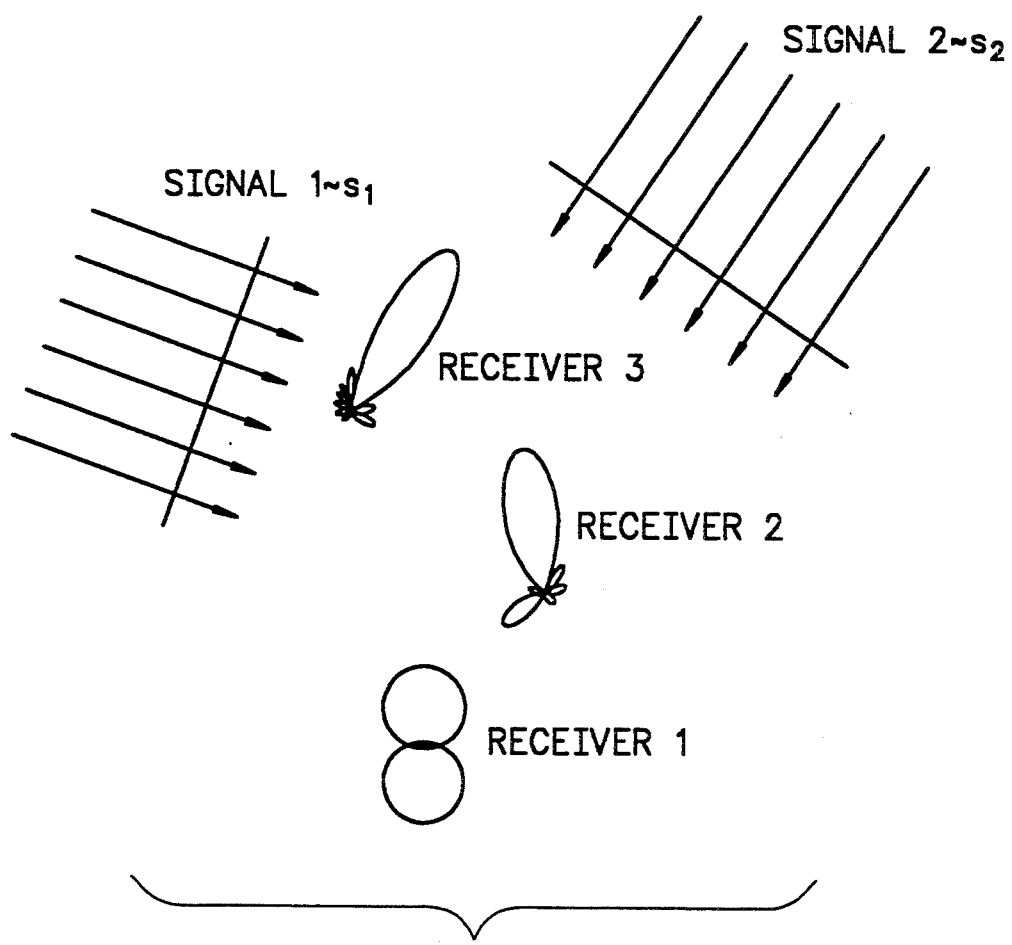
FIG. 3 illustrates passive sensor array geometry.

SLIDE reformulates the multiple line angle estimation into the framework of sensor array processing by the virtue of introducing a propagation scenario for the image under consideration. In the so-called constant-$\mu$ propagation scenario [14], each pixel of the image in a row contributes to a received signal at a hypothetical sensor located in front of the corresponding row of the image matrix. This contribution is in effect equivalent to a phase delay if the pixel is regarded to be a source of electromagnetic wave. More formally, let's assume that all pixels in the image start to propagate narrowband electromagnetic waves with zero initial phases. Furthermore, assume that the waves estimated from pixels in a given row of the image matrix are confined to travel only along that row towards the corresponding sensor. In this propagation environment, each straight line in the image will be in effect equivalent to a wavefront of a travelling planar wave, because the waves of pixels on a line retain constant relative phase along paths parallel to that line. As we will see later, this propagation scenario creates measurements at the sensors similar to the measurements obtained in real antenna array processing.

We assume that a uniform linear array of sensors is located along the vertical axis of the image matrix (4(a)), each sensor receiving signals only from its corresponding row in the matrix according to the following rule. If there are p nonzero pixels on the l-th row of the image matrix located on columns $q_1, \ldots q_p$ respectively, then the sensor in front of the l-th row will receive the signal $$z_l = \sum_{i=1}^{p} e^{-j\mu q_i} \quad (1)$$

where $\mu$ is a constant parameter to be chosen at our convenience [15]. Now assume that there is one straight line in an N×N image with offset $x_0$ and angle $\theta$, as in FIG. 4. Provided that the line width is such that the line gives rise to only one nonzero pixel per row, and that there are no noise pixels, the measured signal at the l-th receiver will be $$z_l = e^{-j\mu x 0_l} e^{j\mu l \tan \theta} \qquad (2)$$

In a more general case, where there are d straight lines and also noise pixels in the image, the signal will be $$z_l = \sum_{k=1}^{d} e^{j\mu l \tan \theta_k} \cdot e^{-j\mu x 0_k} + n_l \qquad (3)$$

where $n_l$ includes the effect of noise in the l-th row, which may consist of individual noise pixels and also takes care of a possible displacement of a line pixel in that row.

Now let us define $$a(\theta_k) = e^{j\mu l \tan \theta_k}, \quad s_k = e^{-j\mu x 0_k} \qquad (4)$$

so that $$z_l = \sum_{k=1}^{d} a(\theta_k) s_k + n_l, \; l = 0, \ldots, N-1 \qquad (5)$$

We will call this signal generation scenario the constant-$\mu$ propagation. This scenario is effectively encoding the line angles as frequencies of cisoidal components in the measurement vector $z = [z_0, \ldots, z_{N-1}]^T$.

As Eq. (3) shows, the measurement vector z includes d cisoidal components contaminated with noise. Any spectral estimation technique (including FET) can be applied in this stage to extract the frequencies of the cisoids. However, since high resolution estimates of the angles are desired, we pursue with exploiting the subspace-based techniques of array processing framework.

Using a window of length M, we can arrange the measurements in a matrix form as $$Z_P \doteq [z_1, \ldots, z_P] = \begin{bmatrix} z_0 & z_1 & \cdots & z_{N-M} \\ z_1 & z_2 & \cdots & z_{N-M+1} \\ \cdot & \cdot & & \cdot \\ \cdot & \cdot & & \cdot \\ \cdot & \cdot & & \cdot \\ z_{M-1} & z_M & \cdots & z_{N-1} \end{bmatrix} \qquad (6)$$

where $P = N + 1 - M$ and the new snapshot vector $z_p \in C^{M \times 1}$ can be written as $$z_p = A(\theta) s_p + n_p \qquad (7)$$

In the above, $A(\theta) = [a(\theta_1), \ldots, a(\theta_d)]$ is an $M \times d$ matrix with k-th column $a(\theta_k) = [1, \lambda_k, \ldots, \lambda_k^{M-1}]^T$ with $\lambda_k = e^{j\mu \tan \theta_k}$. This rearrangement of the data is called spatial smoothing.

Combining Eqs. (5) and (6), we can write $$Z_P = A(\theta) S_P + N_P \qquad (8)$$

where, $$S_P \doteq [s_1, \ldots, s_P] = [I \cdot \Phi \ldots \Phi^{N-M}] s \qquad (9)$$

$$N_P \doteq [n_1, \ldots, n_P] = \begin{bmatrix} n_0 & n_1 & \cdots & n_{N-M} \\ n_1 & n_2 & \cdots & n_{N-M+1} \\ \cdot & \cdot & & \cdot \\ \cdot & \cdot & & \cdot \\ \cdot & \cdot & & \cdot \\ n_{M-1} & n_M & \cdots & n_{N-1} \end{bmatrix} \qquad (10)$$

and where $$s = [e^{-j\mu x 0_1}, \ldots, e^{-j\mu x 0_d}]^T$$

contains the offsets of the lines, and $\Phi = \text{diag}[\lambda_1, \ldots, \lambda_d]$.

Now we are ready to apply the well-studied array processing techniques to the multi-line angle estimation problem. In sensor array processing framework, the goal is to estimate the directions of arrival $\theta$ of d impinging planar wavefronts on the array of M sensors, given P snapshots $z_i$, $i = 1, \ldots, P$. There are many algorithms for solving this problem (see e.g. [10]–[13]), but for the present application a particular one called TLS-ESPRIT appears to be the most appropriate.

In the ideal case of $P \to \infty$, the covariance matrix of the measurements has the following structure $$R_{ZZ} = \lim_{P \to \infty} \frac{1}{P} \sum_{p=1}^{P} z_p z_p^* = A(\theta) R_{ss} A^*(\theta) + \sigma^2 I \qquad (11)$$

where $$R_{ss} = \lim_{P \to \infty} \frac{1}{P} \sum_{p=1}^{P} s_p s_p^* \qquad (12)$$

and it is assumed that $$\lim_{P \to \infty} \frac{1}{P} \sum_{p=1}^{P} n_p n_p^* = \sigma^2 I \qquad (13)$$

Now let the eigendecomposition of $R_{zz}$ be $$R_{zz} = \sum_{i=1}^{M} \lambda_i e_i e_i^* = E_s \Lambda_s E_s^* + E_n \Lambda_n E_n^* \qquad (14)$$

where $\lambda_1 \geq \lambda_2 \geq \ldots \geq \lambda_M$. The matrix $E_s$ contains the d eigenvectors of $R_{zz}$ corresponding to its d largest eigenvalues, i.e. $E_s = [e_1, \ldots, e_d]$. The range space of $E_s$ is called the signal subspace. Its orthogonal complement is called the noise subspace and is spanned by the columns of $E_n = [e_{d+1}, \ldots, e_M]$. It is easily seen from (11) that the smallest eigenvalue of $R_{zz}$ has multiplicity $M - d$ and is equal to the noise variance. Thus, $\Lambda_n = \sigma^2 I$. Moreover, it can be seen that the signal subspace is equal to span $\{A(\theta)\}$, i.e. span $\{E_s\}$ = span $\{A(\theta)\}$, thus explaining the name. This is the basic observation in all subspace-based array processing techniques, including ESPRIT.

In practice, only the same covariance matrix $\hat{R}_{zzP}$ is available, and its eigendecomposition is $$\hat{R}_{zzP} = \frac{1}{P} Z_P Z_P^* = \hat{E}_s \hat{\Lambda}_s \hat{E}_s^* + \hat{E}_n \hat{\Lambda}_n \hat{E}_n^* \qquad (15)$$

where now $\hat{\Lambda}_n \neq \sigma^2 I$, except asymptotically as $P \to \infty$.

Determining the value of d is crucial here because by knowing d we can identify the eigenvectors corresponding to the d largest eigenvalues of $\hat{R}_{zz}$ as a basis for the estimate of the signal subspace. Under the stochastic signal assumption, the minimum description length (MDL) criterion is defined by $$MDL(k) = \qquad (16)$$

$$-\log\left\{\frac{\Pi_{i=k+1}^{M} \lambda_i^{\frac{1}{M-k}}}{\frac{1}{M-k}\Sigma_{i=k+1}^{M}\lambda_i}\right\}^{(M-k)P} + \frac{k}{2}(2M-k)\log P$$

where $\lambda_i$ are the eigenvalues of $\hat{R}_{zz}$. The use of this criterion was first proposed in [16]. The estimate of the number of sources d is given by the value of k for which the MDL function is minimized.

Now define $\hat{E}_1$ as the submatrix $\hat{E}_s$ formed by rows 1 to $M-1$, and $\hat{E}_2$ as the submatrix of rows 2 to M. This is a special case of partitioning the receiver array into two maximally overlapping subarrays with a displacement $\Delta$; here we have chosen $\Delta = 1$ (see FIG. 5). Next form the eigendecomposition of the $2d \times 2d$ matrix $$\begin{bmatrix} \hat{E}_1^* \\ \hat{E}_2^* \end{bmatrix} [\hat{E}_1 \ \hat{E}_2] = F\Lambda F^*. \qquad (17)$$

Partition F into $d \times d$ submatrices, $$F = \begin{bmatrix} F_{11} & F_{12} \\ F_{21} & F_{22} \end{bmatrix} \qquad (18)$$

and then let $\lambda_k$, $k = 1, \ldots, d$ be the eigenvalues of $-F_{12}F_{22}^{-1}$. Finally the line angles are obtained as $$\hat{\theta}_k = \tan^{-1}\left[\frac{c}{\omega\Delta} IM\left(\ln\frac{\lambda_k}{|\lambda_k|}\right)\right] \qquad (19)$$

Estimation of Line Offsets

In this section, we briefly discuss the method used in SLIDE algorithm for estimating the line offsets.

After the angles have been estimated by the method of Sec. 3.1, the offsets can be estimated by either of the three methods described in this section.

As was mentioned above, the vector $$s = [e^{-j\mu x_{01}}, \ldots, e^{-j\mu x_{0d}}]^T$$

contains the offsets of the lines. From the analogy with sensor array processing framework, solving the so-called signal copy problem yields estimates of values of elements of s. This is done by solving the following problem $$\hat{s} = argmin \|z - \bar{A}(\theta)s\|^2 \qquad (20)$$

In a noise-free case, this criterion tries to find appropriate phases for cisoidal signals in order to fit their superposition to the given measurement vector y [17]. It is easy to show that the distribution of the measurement noise is gaussian if the outliers are uniformly distributed over the image [15]. Therefore, the above least squares problem provides the maximum likelihood estimate for the signal vector. Then, the offsets are computed via the relation $$\hat{x}_{0k} = -\frac{1}{\mu} IM\left(\ln\frac{s_k}{|s_k|}\right) \qquad (21)$$

However, the least squares technique is highly sensitive to outliers and its result rapidly degrades if the number of outliers increases. Also in many practical situations, the image may contain only a part of a straight line. In such cases, the above least squares estimate will be biased and unsatisfactory. There also exists a degenerate case in using this technique for offset estimation. Namely, since each straight line is assumed to represent a travelling planar wavefront, it can be shown that the phases of the signals originating from parallel lines cannot be resolved at the sensors. In other words, the received signal will be a coherent superposition of the two or more parallel wavefronts.

Another method for estimating the offsets is to project the image along each of the detected angles and search for a peak in the resulting projection. This method is robust to outliers but suffers from limited resolution problem as we have to choose bin sizes for the projection.

In order to obtain closed-form and high resolution estimates for the offsets, SLIDE proposes another propagation scenario that leads to encoding of the line offsets as frequencies of cisoidal components in the measurement vector. We will call this propagation scheme the variable-$\tau$ propagation for reasons that will become clear shortly. The propagation part of this procedure can be done in parallel with the constant-$\mu$ propagation that encodes the angles, but the offset estimation procedure that follows the new propagation scenario has to be done after the line angles have been estimated.

Assume that there are $d_1$ parallel lines in the image with angle $\theta_1$. Performing the same propagation scheme of above to the pixels on the l-th row and replacing the name of propagation parameter $\mu$ with $\tau$, the signal received at the l-th sensor is $$z_l = \sum_{k=1}^{d_1} e^{j\tau l \tan\theta_1} \cdot e^{-j\tau x_{0k}} + n_l \qquad (22)$$

$$= a_l(\theta_1) \sum_{k=1}^{d_1} e^{-j\tau x_{0k}} + n_l, \ l = 0, \ldots, N-1$$

Now we let $\tau$ vary along the rows of the matrix. For simplicity of the analysis, here we choose $\tau$ to be proportional to the row number l $$\tau = l/\alpha \qquad (23)$$

where $\alpha$ is a constant. Thus, the measurement vector z will now have elements that are functions of $\tau$ $$z_\tau = \sum_{k=1}^{d_1} e^{j\alpha\tau^2\tan\theta_1} \cdot e^{-j\tau x_{0k}} + n_\tau \qquad (24)$$

$$= a_\tau(\theta_1) \sum_{k=1}^{d_1} e^{-j\tau x_{0k}} + n_\tau, \ \tau = 0, \ldots, \alpha(N-1) \qquad (25)$$

As we observe in Eq. (24), in the new measurements $\tau$ appears in quadratic form with the angle and in linear form with the offsets. If there is only one line in the image ($d_1=1$), then the sequence $z_\tau$ will be of the form $$z_\tau = e^{j\alpha\tau 2 \tan\theta_1} \cdot e^{-j\tau x_0} + n_\tau, \quad \tau = 0, \ldots, \alpha(N-1) \quad (26)$$

which has the form of a chirp signal. In general, $z_\tau$ in Eq. (24) represents the sum of $d_1$ chirp signals with the same quadratic term but with different linear terms. The quadratic term can be factored out of the summation and as before be called $a_\tau(\theta_1)$ as in Eq. (25). Since we know the angle $\theta_1$ from the previous analysis (constant-$\mu$ propagation), we can divide $z_\tau$ by $a_\tau(\theta_1)$ and get another sequence $w_\tau$ which is free from the quadratic term in $\tau$. This is basically equivalent to dechirping the measurement sequence. The new measurement vector w has elements of the following form $$\omega_\tau = \frac{z_\tau}{a_\tau(\theta_1)} \quad (27)$$

$$= \sum_{k=1}^{d_1} e^{-j\tau x_0 k} + n_\tau', \quad \tau = 0, \ldots, \alpha(N-1) \quad (28)$$

where $n'_\tau = n_\tau/a_\tau(\theta_1)$ is the new additive noise term.

The sequence $w_\tau$ in Eq. (28) is a superposition $d_1$ cisoids plus noise. The frequency of each of the cisoids is proportional to one of the line offsets. Therefore, we have reformulated the offset estimation problem as a time series harmonic retrieval problem. By exploiting the eigenstructure of the covariance matrix of the measurements and subspace fitting techniques of sensor array processing, high resolution estimates of the offsets can be obtained. Also the number of parallel lines for each angle can be estimated using the minimum description length criterion.

In general, an image may contain parallel and non-parallel lines. In order to analyze the nature of the measurement vector w in that case, let's assume that there are $d_1$ parallel lines in the image with angle $\theta_1$ and $d_2$ parallel lines with angle $\theta_2$. We order the offsets of all the lines such that $$x_{0_1}, \ldots, x_{0_{d_1}}$$

correspond to the lines with angle $\theta_1$ and $$x_{0_{d_1+1}}, \ldots, x_{0_{d_1+d_2}}$$

correspond to the lines with angle $\theta_2$. The z vector will have elements $$z_\tau = \sum_{k=1}^{d_1} e^{j\alpha\tau 2\tan\theta_1} \cdot e^{-j\tau x_0 k} + \sum_{k=d_1+1}^{d_1+d_2} e^{j\alpha\tau 2\tan\theta_2} \cdot e^{-j\tau x_0 k} + n_\tau \quad (29)$$

$$= a_\tau(\theta_1) \sum_{k=1}^{d_1} e^{-j\tau x_0 k} + a_\tau(\theta_2) + \sum_{k=d_1+1}^{d_1+d_2} e^{-j\tau x_0 k} + n_\tau, \quad (30)$$

$$\tau = 0, \ldots, \alpha(N-1)$$

Now consider the estimation of the offsets of the new lines having angle $\theta_1$. As before, by dividing the sequence $z_\tau$ by $a_\tau(\theta_1)$, we dechirp the components of the measurement sequence that are contributions from angle $\theta_1$. This results in $$w_\tau^{(\theta_1)} = \frac{z_\tau}{a_\tau(\theta_1)} \quad (31)$$

$$= \sum_{k=1}^{d_1} e^{-j\tau x_0 k} + \frac{a_\tau(\theta_2)}{a_\tau(\theta_1)} \sum_{k=d_1+1}^{d_1+d_2} e^{-j\tau x_0 k} + n_\tau' \quad (32)$$

$$= \sum_{k=1}^{d_1} e^{-j\tau x_0 k} + e^{j\alpha\tau 2(\tan\theta_2 - \tan\theta_1)} \sum_{k=d_1+1}^{d_1+d_2} e^{-j\tau x_0 k} + n_\tau', \quad (33)$$

$$\tau = 0, \ldots, \alpha(N-1)$$

The terms corresponding to angle $\theta_1$ have been dechirped and transformed to pure cisoids as before. The terms corresponding to angle $\theta_2$ however, have been transformed to another chirp form. The basic assumption for applying the ESPRIT algorithm to the harmonic retrieval problem is that the components s(t) of the underlying analog signal be narrowband, i.e. for each component we can write $s(t-t_0) \approx e^{-j\omega t_0} s(t)$. If only the pure cisoids corresponding to the liens with angle $\theta_1$ were present, this condition would be directly satisfied. The sequence $w_\tau^{(\theta_1)}$ in Eq. (33) contains both pure cisoids and chirp components. However, the energy of the chirp components is distributed over the frequency axis and they can be considered as noise in the analysis. Therefore, the harmonic retrieval procedure will be able to detect the pure cisoids corresponding to the angle under consideration. More clarification and examples for this point will be presented later. In a general case, the variable-$\tau$ propagation needs to be performed only once, and the dechirping and harmonic retrieval procedures have to be done for each of the detected angles.

The procedure of above is then used to rearrange the sequence $w_\tau$ into a Hankel matrix $W_P$ as in Eq. (6) and then to implement the subspace-based estimation techniques such as ESPRIT to solve for the frequency components in $w_\tau$ which correspond to the line offsets.

Practical Issues

Generalizing to Grey-Scale Images

The formalism introduced above can also be generalized to handle the problem of straight edge detection in grey-scale images. Namely, we can start from a grey-scale image and detect parameters of straight lines in that image. This is accomplished by simply assigning an amplitude to the propagated signal from each pixel proportional to the grey-scale value of that pixel. A primitive edge enhancement procedure may be used first in this case to attenuate background contributions. This edge enhancement can in general be as simple as a shirt-and-subtract or a contrast enhancement procedure applied to the image.

Mathematically, if the edge strength in the first row (after edge enhancement) is represented by a function $f(x) = g(x - x_0)$, then the sensor in front of the first row will receive $$z_0 = \sum_{x=0}^{N-1} e^{-j\mu x} f(x) \quad (34)$$

$$= \sum_{x=0}^{N-1} e^{-j\mu x} g(x - x_0)$$

$$= e^{-j\mu x_0} \sum_{x=0}^{N-1} e^{-j\mu x} g(x) = e^{-j\mu x_0} G(\mu)$$

where $G(\mu)$ is equal to the Fourier transform of $g(x)$ at a single frequency point, and is a constant. In binary images we have $G(\mu) = 1$. The edge strength in row 1 (in a one-line and noise-free image) will be equal to $g(x-x_0+l\tan\theta)$, and the receiver in front of that row will read $$z_l = \sum_{x=0}^{N-1} e^{-j\mu x} g(x - x_0 + l\tan\theta) \quad (35)$$
$$= e^{-j\mu x_0} \cdot e^{j\mu l \tan\theta} \sum_{x=0}^{N-1} e^{-j\mu x} g(x)$$
$$= e^{-j\mu x_0} \cdot e^{j\mu l \tan\theta} G(\mu)$$

The only difference between the above equation and Eq. (2) is the appearance of a constant ($G(\mu)$) as the amplitude. This treatment shows that identical procedures as those that are proposed for line fitting in binary images can be performed on edge-enhanced grey-scale images.

A case of interest in line fitting in grey-scale images is non-uniformity in edge strength over different image lines. Mathematically, the deviation in value from the nominal (or average) edge strength can be lumped into the noise term for each line. Simulation results show that as long as the signal to noise ratio remains in a reasonable level, the algorithm is still able to detect the edge in these cases.

Aliasing Issues

As was mentioned above, the solution is provided in two steps. First, the line directions are estimated and then an estimate of the offsets is obtained. We start with the estimation of line angles $\theta_k$, $k=1,\ldots d$. Using the TLS-ESPRIT algorithm, the angles are estimated via the relation $$\hat{\theta}_k = \tan^{-1}\left[\frac{1}{\mu\Delta} Im\left(\ln\frac{\lambda_k}{|\lambda_k|}\right)\right] \quad (36)$$

where $\Delta$ is the displacement between the two subarrays used in the ESPRIT algorithm. In the above equation, normalization is done in order to compensate for possible perturbations in magnitude of $\lambda_k = e^{j\mu\Delta \tan\theta_k}$ from unity. The range of non-ambiguous angles is determined by the following formula $$-\pi < \mu\Delta\tan\theta_k < \pi \rightarrow |\theta_k| \leq \tan^{-1}\left(\frac{\pi}{\mu\Delta}\right) \quad (37)$$

Values of $\mu$ and $\Delta$ can be chosen appropriately in order to avoid the ambiguity problem. It is also worth mentioning that since the value of $\mu$ is not dictated by the physics as it is the case in sensor array processing, improved resolution can be achieved by increasing its value. To be more specific, from Eq. (37) we must choose $$|\mu| \leq \frac{\pi}{\Delta\tan\theta_k}, \text{ all } k \quad (38)$$

in order to avoid ambiguity. In practice however, due to the fact that the image is in fact discretized (sampled), the value of $\mu$ cannot be chosen higher than $\pi$. For angle estimation stage, $\mu$ is better to be chosen to have a value around unity to provide both non-ambiguity and good resolution. In estimating the offsets, the value of $\mu$ should be chosen such that the line offsets do not become ambiguous. In other words, since the received signal due to a pixel at a receiver has a period equal to $2\pi$, and offsets can have values in the range $[0, N-1]$, $\mu$ has to be chosen such that $|\mu| \leq 2\pi/N$. Therefore, it is recommended that the propagations performed in angle and offset estimation steps be performed with different values of $\mu$.

The aliasing issue arises also in the line offset estimation problem. Here, the factor that needs to be controlled is the step size chosen for the sequence $\tau$, which we call $\delta\tau$. Larger values of $\delta\tau$ result in more periods of the cisoids in the data records which is desirable if aliasing does not occur. In general, the value of $\delta\tau$ should satisfy $$\delta\tau < \frac{2\pi}{N} \quad (39)$$

in order that aliasing does not happen. However, if an estimate of the maximum possible value for all line offsets is available, the N in the above formula can be replaced by that value and $\delta\tau$ can be increased accordingly.

Combining Different Estimation Results

Another flexibility of the proposed algorithm that can be exploited to improve the signal to noise ratio of the angle estimation procedure is the possibility of doing estimation using hypothetical sensors along the x-axis as well and then combining the results of the two estimations.

In offset estimation procedure, the mentioned combination of estimates along the x-axis and the y-axis can help to improve the results. Moreover, we can observe that in this case the lines that have larger offsets are transformed to cisoids with higher frequencies. These frequencies can normally be detected more accurately due to the presence of many cycles of the signal in the data record. Therefore, the propagation can be performed along both positive and negative directions of the coordinate axes, and in each case the more accurate results be chosen according to the location of the estimated offsets. For example, with propagating along negative x-axis, offset estimates with values larger than N/2 are more accurate, while with propagating along positive x-axis, the estimates that are less than N/2 are preferred.

Partial Extent Lines

Another practical issue arises when there are line segments in the image rather than long lines. The spatial smoothing procedure provides a level of robustness for the process of angle estimation by sliding a small size window over the measurement vector. This way, a line with a support long enough to be included in many windows will be adequately represented in the covariance matrix. However, small support lines cannot be represented adequately and won't be resolved in the estimation. A remedy for such a case is to divide the image into several smaller sub-images and perform the analysis on each sub-image. The results of individual sub-image estimations can be put together to obtain parameters of both long and short lines in the image. In order to clarify why lines that have partial support in the image can be detected, the following observation is also worth mentioning. The basic assumption for applying the subspace techniques to a set of subsequent snapshots is that there exists a certain phase relation between subsequent snapshots. The matrix $\Phi$ in the ESPRIT algorithm is in fact a diagonal matrix containing these phase relations for different signal components. In the SLIDE algorithm, this phase relation is retained between subsequent subvectors made from measurements that result from lines with partial extent. More specifically, snapshots (subvectors) that are fully covered by the lateral extent of the line clearly satisfy the phase relationship. Snapshots that come from the outside of the line support have zero contribution to the estimate (although in the presence of noise they tend to lower the SNR). Finally, for snapshots that are partially covered by the line lateral extent, the phase relation is preserved between each two subsequent snapshot in all but two points that correspond to the ends of the line support. This is the case simply because the same phase relationship that exists for the nonzero part of the snapshots can be assumed to exist for the identically-zero parts of them. Another viewpoint about this observation follows shortly.

Choice of the Window Size

In the procedure of windowing the long $N \times 1$ measurement vector z (and w) to produce the matrix $Z_P$ (and $W_P$), the values of P and M need to be chosen such that P plays the role of number of snapshots and M is the dimension of the snapshots. Obviously, for the sample covariance matrix to approximate the true covariance matrix, we need to choose a large P. On the other hand, choosing the dimension M of the new vectors large helps to smooth out the eigenvalues corresponding to the noise subspace of the covariance matrix. Therefore, in order to make the best use of the measurement vector, sub-vectors are chosen in such a way to maintain maximum overlap with their adjacent neighbors. With this choice, there will be a fixed relation between the number of snapshots P, and the dimension of the new measurement vector M, namely $P+M=N+1$. It should also be mentioned that choosing the dimension of new vectors to be very large increases the dimension of the sample covariance matrix. This results in dramatic increase in computation load if one tries to obtain the whole eigendecomposition of the sample covariance matrix; however, if the so called Fast Subspace Decomposition (FSD) technique of Xu and Kailath [18] which is based on the Lanczos algorithm [19, 1] is used to extract only the signal subspace of the sample covariance matrix, the computation load will increase linearly with M.

Computational Complexity of Slide vs the Hough Transform

In order to compare the computational effort needed in SLIDE with that of the Hough transform method, two cases are considered here. In the first case, it is assumed that the image is binarized and that there is one pixel in each row of the $N \times N$ image matrix for every one of the d lines. Without the presence of any outliers, the computational effort needed for applying the Hough transformation to all pixels will be of $O(N^2d)$ provided that we choose to discretize the $\theta$ axis to N bins; in some applications, we may have prior information about the possible range of the angles, and discretize only that range into N bins. In addition to the above, a search procedure is needed for estimating the location of peaks in the transform plane. On the other hand, SLIDE needs $O(Nd)$ calculations for the propagations and $O(N M^2)$ for the complete eigendecomposition of the sample covariance matrix. However, if the structure of the data matrix is exploited and also only the signal subspace of the sample covariance matrix is extracted as in the new method of Xu and Kailath [18] (note that this subspace contains all needed information for estimating the parameters), then the total computation load of SLIDE will be further decreased to $O(N(M+2d))$. In practice, the value of M is chosen around $\sqrt{N}$, so the computational complexity of SLIDE in this case is $O(N^{3/2})$ compared to $O(N^2d)$ for the Hough transform method. In the second case, it is assumed that all the $N^2$ pixels in the image participate in the computations (e.g. we have a grey-scale image). In this case, the Hough transform method requires $O(N^3)$ calculations plus search. The computational effort for SLIDE in this case will be $O(N^2)$ for the propagations and again $O(N(M+d))$ for the rest of the calculations. So the computational complexity of SLIDE in this case is $O(N^2)$ as compared to $O(N^3)$ for the Hough transform method. This reduction in computational complexity could allow real-time implementation of SLIDE.

Summary of the Slide Algorithm

In this section, an outline of the SLIDE algorithm as applied for estimating angles and offsets of straight lines and edges in an image is presented. Again, the image size is assumed to be $N \times N$.

If the image is binary, go to the next step. If the image is grey-scale, produce an edge-enhanced image from the digitized grey-scale image. This can be done by a simple shift an subtract (one-pixel gradient) operator or a contrast enhancement procedure.

Perform the constant-$\mu$ propagation as discussed above on the image and obtain the measurement vector z. In edge-enhanced grey-scale images, this can be done by multiplying each row of the image matrix by the vector $[1, e^{-j\mu}, e^{-j2\mu}, \ldots, e^{-j(N-1)\mu}]^T$. However, in binary images savings in computations can be made by performing calculations only on nonzero pixels of the image.

In this stage, any spectral estimation method can be applied to estimate the cisoidal components of z. However, in order to obtain high resolution and closed-form estimates, use subspace-based techniques of array processing as follows.

Rearrange the measurement vector using Eq. (6) such that P snapshot vectors of size M are produced.

Compute the sample covariance matrix of the snapshots as in Eq. (15); and perform its eigendecomposition. By applying the MDL method, the number of present angles can be estimated.

Estimate the angle by any subspace-based method. An outline of how to exploit the ESPRIT algorithm is presented above. ESPRIT provides high resolution estimates without the need for a search procedure in the parameter space.

After knowing the angles of the lines, estimate the offsets by any of the three methods that follow. Using least-squares minimization as in Eq. (20), or projecting the image along each detected angle and searching for peaks, or applying the variable-$\tau$ propagation stage of SLIDE as described in Sec. 3.2 and summarized below.

For exploiting the offset estimation part of SLIDE, perform the variable-$\tau$ propagation (as described in Sec. 3.2), by multiplying each line of the image matrix by a vector as follows. Numbering the rows of the image matrix from 0 to $N-1$, multiply the l-th row by the vector $[1, e^{-jl/\alpha}, e^{-j2l/\alpha}, \ldots, e^{-j(N-1)l/\alpha}]^T$ to obtain measurement vector z. (Again, in binary images computational savings can be made by only performing calculations only on nonzero pixels.)

If there are d different angles in the image, perform the following stages for dechirped measurements for each angle obtained from the measurement vector.

Divide each element of the measurement vector by the corresponding element response value as in Eq. (28) to get the dechirped measurement vector w.

Rearrange the elements of w the same way the measurement vector z was rearranged in angle estimation stage to get P snapshots each of length M.

Compute the sample covariance matrix of the new snapshots and perform its eigendecomposition. Use the a priori knowledge or MDL to decide on the number of present parallel lines.

Exploit the ESPRIT algorithm (or other spectral estimation methods) to get estimates of the offsets.

Experimental Results

In this section, several experimental results of applying the SLIDE algorithm to estimating the parameters of lines in images are provided. In order to make comparisons, the method of Hough transform which is essentially a projection technique is also applied to images and the results of both approaches are presented. It is worth re-emphasizing here that the estimates provided by the SLIDE algorithm are high resolution while the Hough transform (and projection) results are limited in resolution to the bin sizes chosen for the parameters. Also, SLIDE is computationally much more efficient than the Hough transform and there is no need for a search procedure in the parameter space or curve reading in its implementation.

Figure 6A:
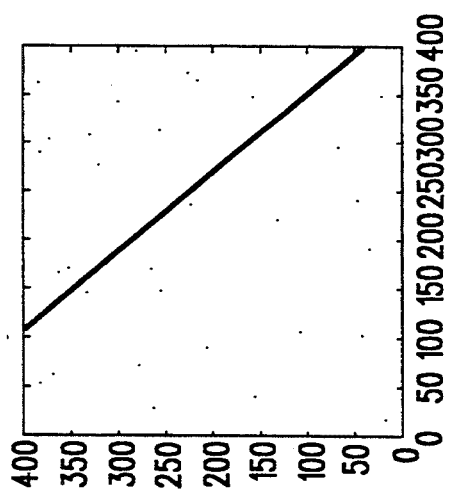
FIGS. 6(a)–6(c) are illustrations of measurement vectors in the line angle and offset estimation problems: (a) image matrix, (b) projection vector obtained in the constant-$\mu$ propagation for angle estimation, (c) projection vector obtained in variable-r propagation for offset estimation, (top) before, and (bottom) after dechirping. Estimation results: $\hat{\theta} = -39.9905°$, $\hat{x}0 = 100.9645$ pixels.
Figure 6C:
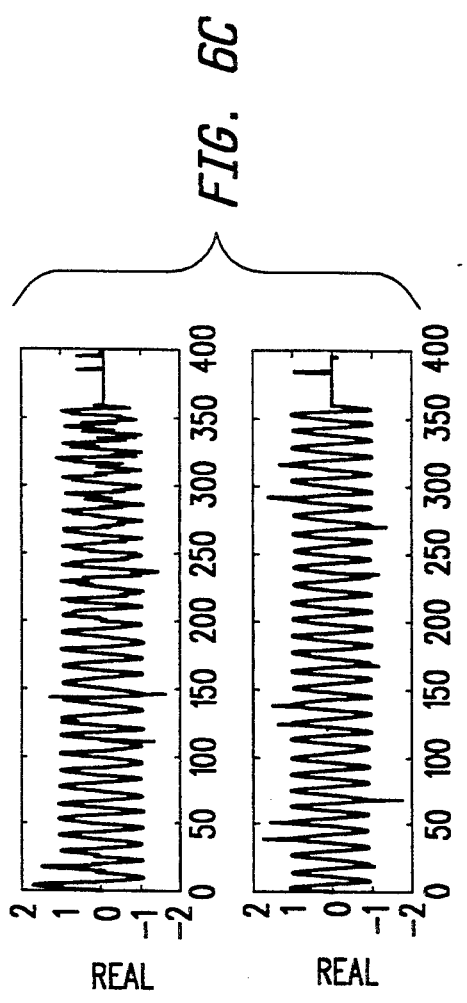
Figure 6B:
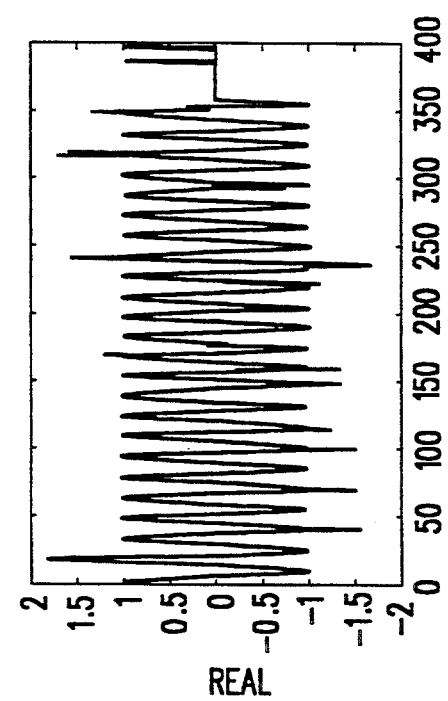

FIG. 6 illustrates the measurement vectors obtained in constant-$\mu$ propagation and variable-$\tau$ propagation. FIG. 6(a) shows an image containing a straight line and outliers. In FIG. 6(b) the measurement vector obtained in constant-$\mu$ propagation is shown. In FIG. 6(c), the measurement vector obtained in variable-$\tau$ propagation is shown (top) before, and (bottom) after dechirping. The line angle and offset estimation problems are transformed to the problem of estimating frequencies of cisoids contaminated in noise.

Figure 7A:
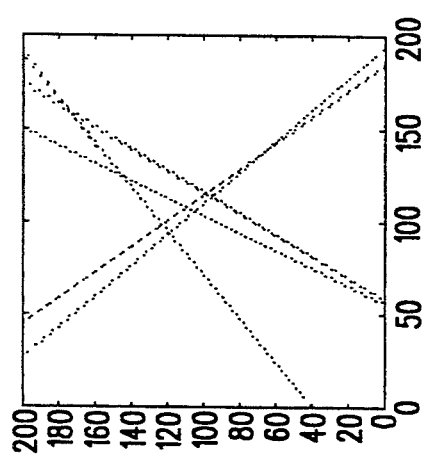
FIGS. 7(a)–7(d) illustrate (a) image matrix, (b) the minimum description length function, (c) estimated line angles via different array procssing techniques, and (d) regenerated image using the estimated line parameters by SLIDE.
Figure 7D:
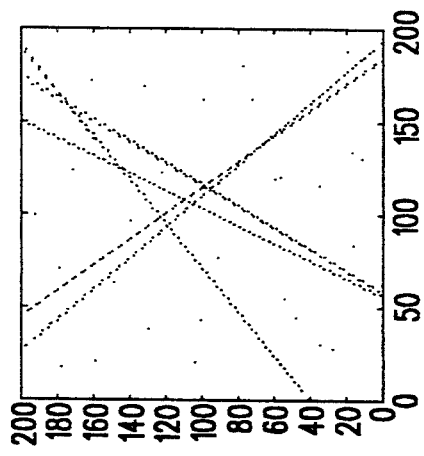
Figure 7C:
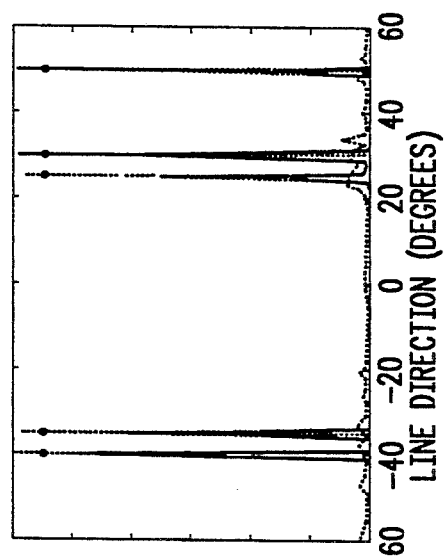
Figure 7B:
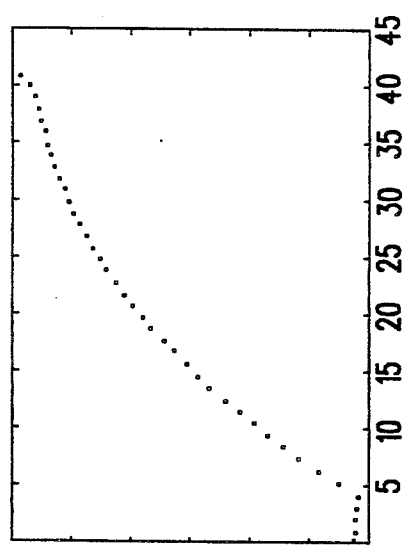

In FIG. 7(a), an image containing five nearly collinear pixel sets is shown. The line angles are {−40, −35, 25, 30, 50} degrees and the line offsets are [25, 45, 150, 175, 190} pixels, respectively. After performing the constant-$\mu$ propagation and computing the sample covariance matrix of the measurements, the minimum description length function is calculated. This function is shown in FIG. 7(b); the location of its minimum is an estimate of the number of lines in the image. In FIG. 7(c), the results of applying different sensor array processing techniques to this example are presented; the ESPRIT algorithm requires no search procedure and is by far the fastest one to use. The estimated angles by SLIDE are {−40.0424, −35.0399, 25.2412, 30.2075, 50.0380} degrees and the estimated offsets are {25.7130, 44.9882, 151.1676, 174.0602, 190.0925} pixels, respectively. Using these values, the image of FIG. 7(d), is regenerated.

Figure 8B:
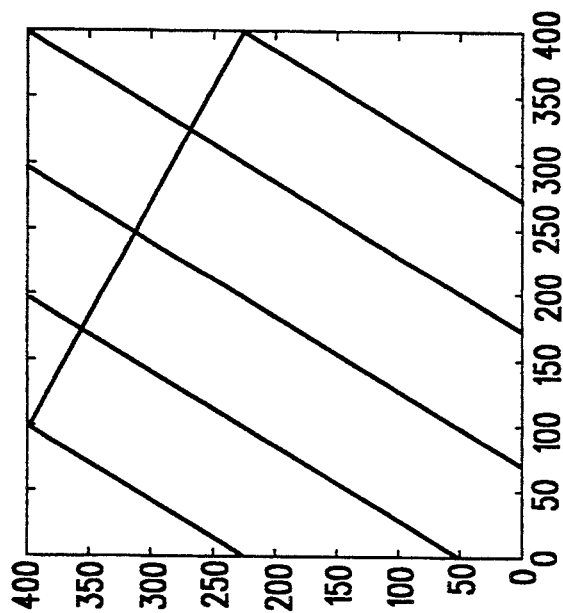
FIGS. 8(a) and 8(b) illustrate another example of line fitting by the proposed method, (a) original image with parallel and crossing lines, and (b) reconstructed image using the estimated line parameters: $\hat{\theta} = 30.0636°$, $-60.0041°$, $\hat{x}0 = 98.5226$, $199.6088$, $300.1067$, $400,0804$, $500.7668$, and $100.7426$ pixels.
Figure 8A:
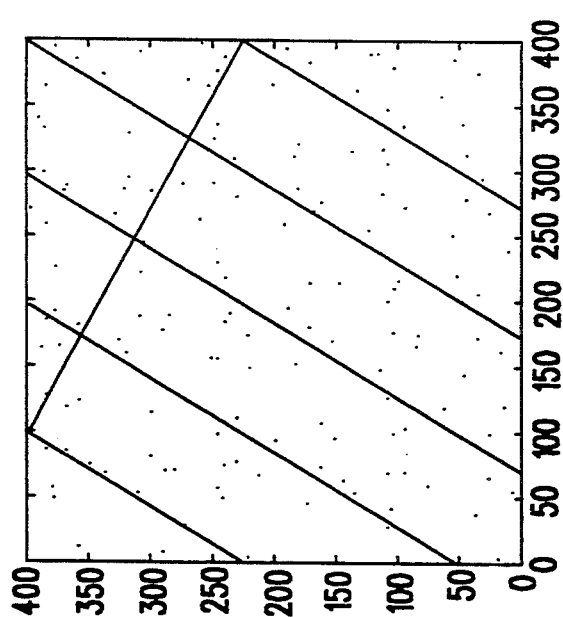

Another example is presented in FIG. 8 in which parameters of the parallel and crossing lines in an image are estimated.

Figure 9A:
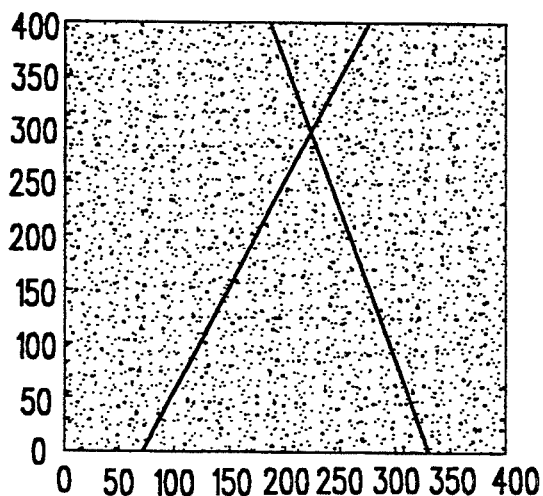
FIGS. 9(a)–9(f) illustrate (a) an example of a noisy image, (b) Hough transform output plane, (c)–(f) comparison of the results obtained by SLIDE and the Hough transform method, with dotted lines the results of SLIDE and solid curves are cross sections of the Hough transform plane where maxima occur, (c), (d) angle estimates, (e), (f) offset estimates.

To compare the efficiency and speed of the proposed technique with the standard method of Hough transform, we consider the rather noisy image of FIG. 9(a).

This image is 400×400 pixels and was generated to contain two lines with random angles $\theta$=19.8418°, 27.2582° and random offsets $x_0$=186.8439, 277.2624 pixels, respectively. Note that due to discretization effects, the actual values may be slightly different from the above. For applying the Hough transform, we need to choose a search range for the angle and a bin size for discretizing the normal distance ($\rho$) of lines from the origin. For this example, a uniform range of angles was chosen between −35° and 35° with 0.1° steps. The bin size for $\rho$ was chosen to be 0.5 pixels. Note that $\rho$ is the normal distance of lines from the origin, and the corresponding x-axis offset is computed by $$\hat{x} = \frac{\hat{\rho}}{\cos\hat{\theta}}.$$

Figure 9B:
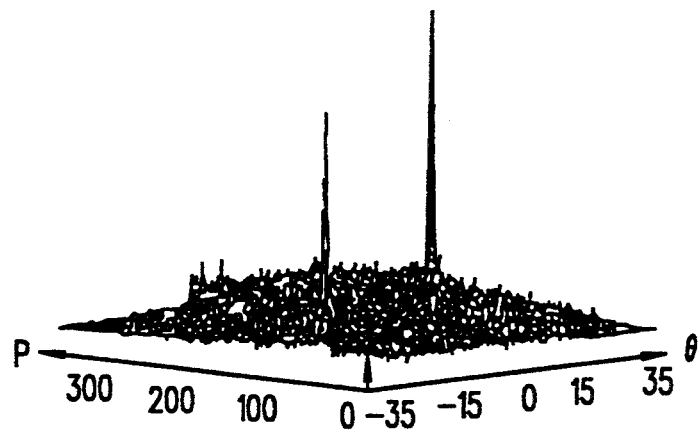
Figure 9D:
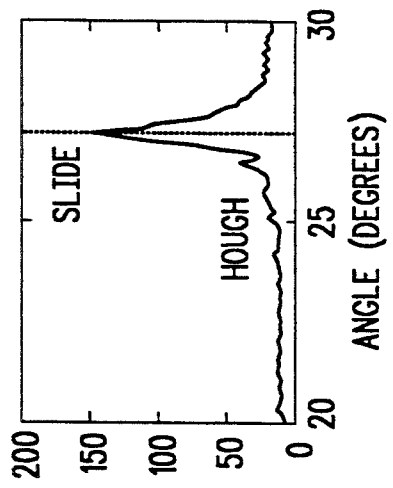
Figure 9F:
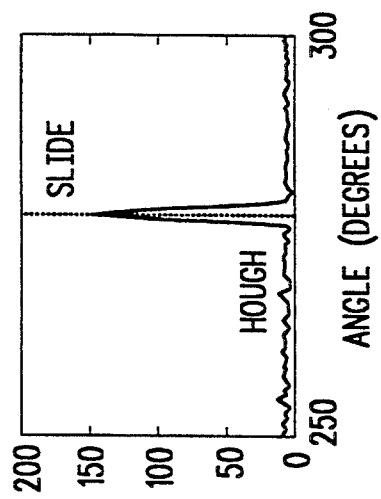
Figure 9C:
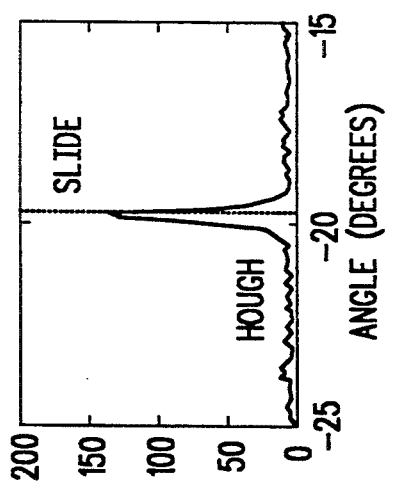
Figure 9E:
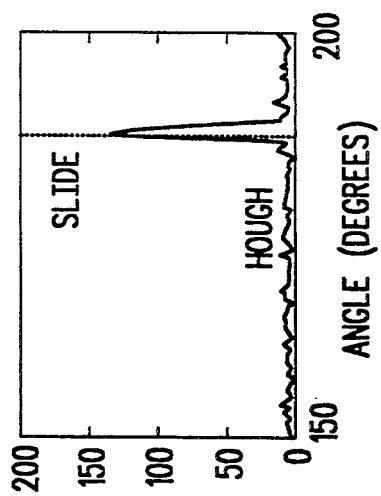

FIG. 9(b) shows the Hough transform output plane, where the coordinates of the peaks yield estimates for $\theta$ and $\rho$. Cross sections of the Hough transform plane at the locations of the peaks are depicted in FIG. 9(c)–(f) together with estimates obtained by SLIDE. The numerical values are as follows. The estimates by SLIDE are $\hat{\theta}$=−19.7485°, 27.2491° and $\hat{x}_0$=187.1408, 277.6463 pixels. Performing a search in the Hough transform output plane, yields the angle estimates as $\hat{\theta}$=−19.8°, 27.2° and the offset estimates as $\hat{x}_0$=187.6, 277.7 pixels. It is seen that both techniques yield rather accurate estimates, however, the effort of computations of SLIDE is about an order of magnitude (400 times in this example) less than that of the Hough transform. Also, the Hough transform method needs a large memory space to store and accumulate the output.

Figure 10A:
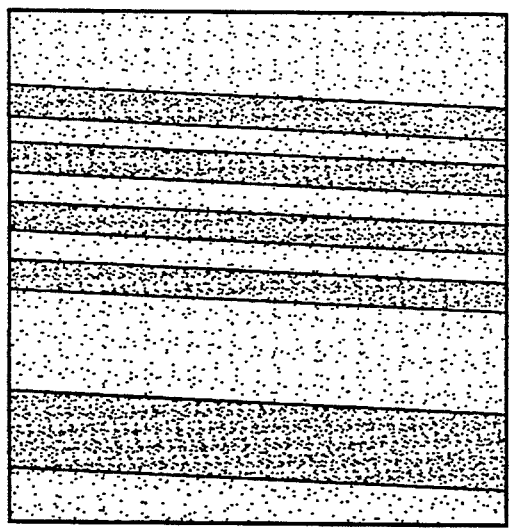
FIGS. 10(a)–10(d) illustrate (a) original image showing part of a semiconductor wafer, (b) edge-enhanced image, and estimates of the lines angle (c), and offsets (d) by SLIDE and the Hough transform method.
Figure 10B:
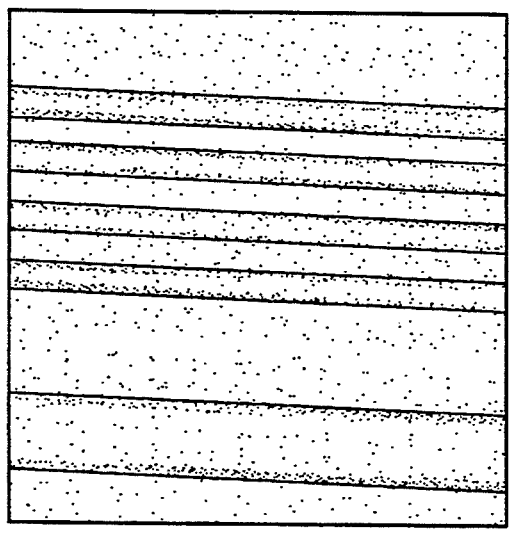
Figure 10C:
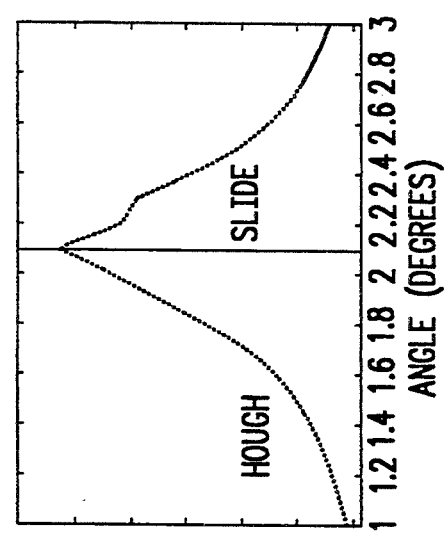
Figure 10D:
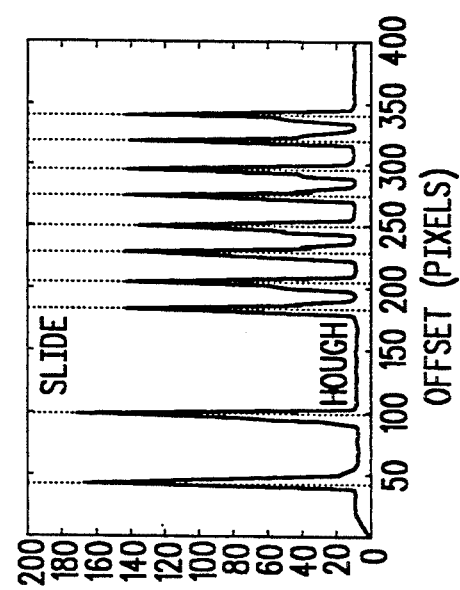

As is discussed above, a straight-forward generalization of the proposed algorithm for being applied to grey-scale images can be readily derived. Consider the grey-scale image shown in FIG. 10(a). First, a primitive edge enhancement was done on this image in order to attenuate the background contributions. This was done by shifting the image matrix by one pixel, subtracting the result from the original matrix, and taking the absolute value of the resulting matrix. The image of FIG. 10(b) shows the result of this edge enhancement procedure. Then, SLIDE and the Hough transform method were applied to this image. FIGS. 10(c), (d) show the angle and offset estimation results, respectively.

Figure 11A:
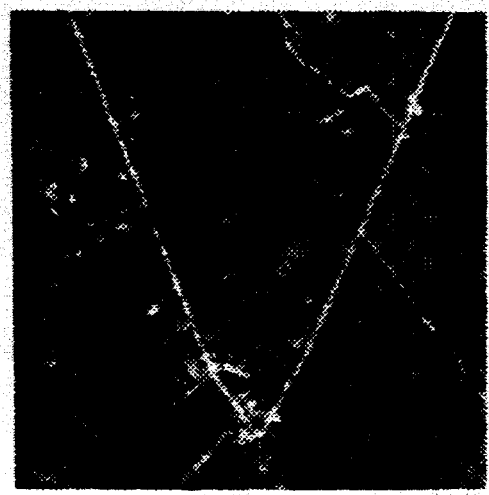
FIGS. 11(a)–11(c) illustrate (a) aerial image, (b) high-contrast image, (c) detected straight roads superimposed on the contour plot of the aerial image. The angle estimates are $-21.2685°$ and $24.7177°$ relative to the vertical axis. The offset estimates are $48.5027$ and $379.6986$ pixels, respectively.
Figure 11B:
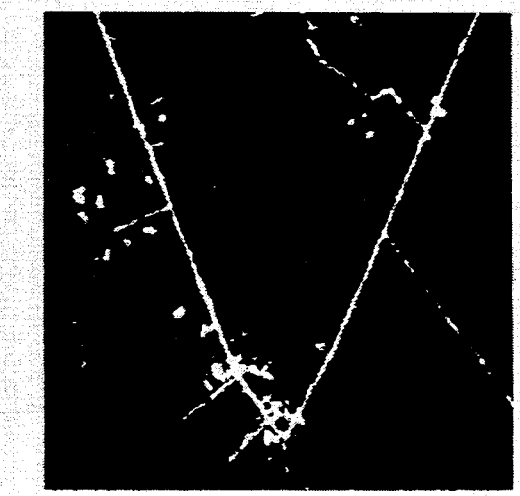
Figure 11C:
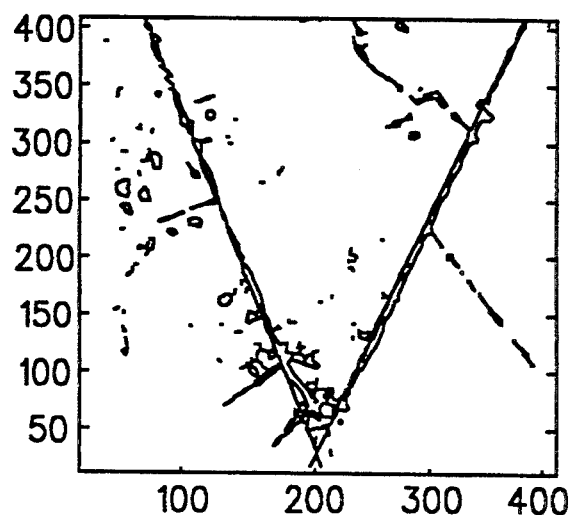

In FIG. 11, the result of applying SLIDE to a real aerial image is presented. FIG. 11(a) shows the original aerial image. The high-contrast image of FIG. 11(b) is used for line detection. In FIG. 11(c), the results of line detection are superimposed on the contour plot of the image.

Figure 12A:
FIGS. 12(a)–12(c) illustrate an example of detecting linearly aligned objects: (a) aerial airport image, (b) high-contrast image, (c) estimated support line of the airplanes superimposed on the contour plot of the aerial airport image. The angle estimate is $12.6081°$ relative to the vertical axis. The offset estimate is $123.8449$ pixels.
Figure 12B:
Figure 12C:
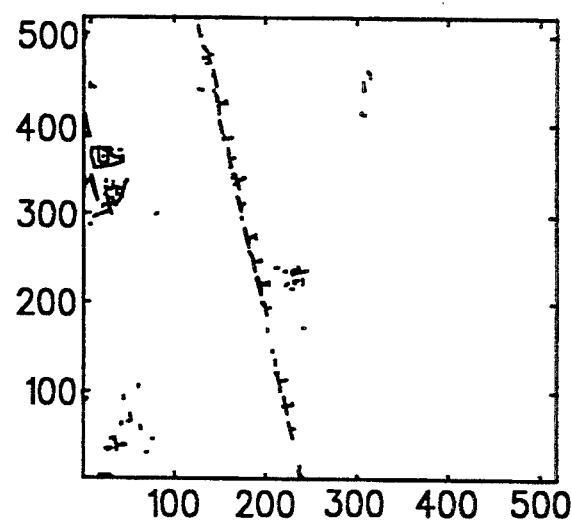

FIG. 12 is an example of detecting linearly aligned objects by SLIDE. FIGS. 12(a), (b) show the original and high-contrast aerial images in which several airplanes are aligned along a certain direction which we might like to determine. This is an illustrative example of non-uniform edge strength over different image rows. Applying the SLIDE algorithm to the high-contrast image results in line parameters that are used to generate the dotted line in FIG. 12(c). As this figure suggests, the direction along which the airplanes lie seems to be well estimated by the algorithm.

Figure 13:
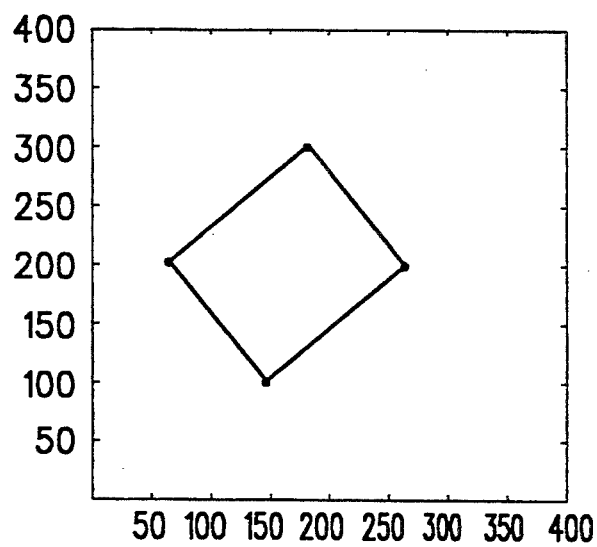
FIG. 13 illustrates corners of the rectangle which are detected by fitting lines to its sides.

In FIG. 13, SLIDE is applied to detection of the sides (and hence the corners) of a rectangle. Although the sides of the rectangle have a limited extent in the image (and in the measurement vector), the estimates of the corners are reasonably accurate.

While the invention has been described with reference to specific embodiments, the description is illustrative of the invention and is not to be construed as limiting the invention. Various modifications and applications may occur to those skilled in the art without departing from the true spirit and scope of the invention as defined by the appended claims.

APPENDIX A

References

[1] G. H. Golub and C. F. Van Loan, *Matrix Computations*, Johns Hopkins University Press, Baltimore, Md., 1984.

[2] S. Van Huffel and J. Vandewalle, "The Total Least Squares Technique: Computation, Properties and Applications", In E. F. Deprettere, editor, *SVD and Signal processing: Algorithms, Applications and Architectures*, pages 189–207. Elsevier Science Publishers, 1988.

[3] P. Hough, "Method and Means for Recognizing Complex Patterns", U.S. Pat. No. 3,069,654, 1962.

[4] R. O. Duda and P. E. Hart, "Use of the Hough Transform to Detect Lines and Curves in Pictures", *Communications of the ACM*, 15:11–15, 1972.

[5] A. K. Jain, *Fundamentals of Digital Image Processing*, Prentice-Hall, Englewood Cliffs, N.J., 1989.

[6] S. R. Deans, *The Radon Transform and Some of Its Applications*, John Wiley & Sons, New York, N.Y., 1983.

[7] W. Niblack and D. Petkovic, "On Improving the Accuracy of the Hough Transform: Theory, Simulations and Experiments", In *Proc. IEEE Conf. on Computer Vision and Pattern Recognition CVPR'88*, pages 574–579, 1988.

[8] E. R. Davies, *Machine Vision: Theory, Algorithms, Practicalities*, Academic Press, London, 1990.

[9] N. Kiryati and A. M. Bruckstein, "On Navigation Between Friends and Foes", *IEEE Trans. on Pattern Analysis and Machine Intelligence*, 13(6):602–606, 1991.

[10] R. O. Schmidt, "Multiple Emitter Location and Signal Parameter Estimation", In *RADC Spectrum Estimation Workshop*, Griffiss AFB, NY, 1979.

[11] A. Paulraj, R. Roy, and T. Kailath, "Estimation of Signal Parameters by Rotational Invariance Techniques (ESPRIT)", In *Proc. of 19th Asilomar Conference on Circuits, Systems and Comp.*, 1985.

[12] M. Viberg, B. Ottersten, and T. Kailath, "Detection and Estimation in Sensor Arrays Using Weighted Subspace Fitting", *IEEE Trans. on SP*, 39(11):2436–2449, Nov. 1991.

[13] R. Roy and T. Kailath, "ESPRIT: Estimation of Signal Parameters via Rotational Invariance Techniques", *IEEE Trans. on ASSP*, 37(7):984–995, July 1989.

[14] H. K. Aghajan and T. Kailath, "SLIDE: Subspace-based Line Detection", In *Proc. of IEEE ICASSP*, Minneapolis, Minn., to appear, April 93.

[15] H. K. Aghajan and T. Kailath, "Sensor Array Processing Techniques for Super Resolution Multi-Line Fitting and Straight Edge Detection", *IEEE Trans. on Image Processing*, to appear, 93.

[16] M. Wax and T. Kailath, "Detection of Signals by Information Theoretic Criteria", *IEEE Trans. on ASSP*, 33(2):387–392, April 1985.

[17] H. K. Aghajan and T. Kailath, "A Subspace Fitting Approach to Super Resolution Multi-Line Fitting and Straight Edge Detection", In *Proc. of IEEE ICASSP*, pages III:121–124, San Francisco, Calif., 1992.

[18] G. Xu and T. Kailath, "A Fast Algorithm for Signal Subspace Decomposition and Its Performance Analysis", In *Proc. of IEEE ICASSP*, pages 3069–3072, Toronto, Canada, 1991.

[19] B. N. Parlett, *The Symmetric Eigenvalue Problem*, Prentice-Hall, Englewood Cliffs, N.J., 1980.

What is claimed is:

1. A method of estimating line parameters including angles and offsets of straight lines in a two-dimensional image comprising the steps of
    a) producing an edge-enhanced image from a grey-scale image,
    b) performing a constant-$\mu$ propagation on the image to obtain a measurement vector z,
    c) estimating the cisoidal components of said measurement vector z including the number of angles present, and
    d) estimating the offsets of lines for each angle.

2. The method as defined by claim 1 wherein step c) includes
    rearranging the measurement vector such that P snapshot vectors of size M are produced,
    computing the same covariance matrix of said snapshots, and
    performing eigendecomposition of said sample covariance matrix to estimate the number of angles present.

3. The method as defined by claim 1 wherein step d) includes using a least-squares minimization.

4. The method as defined by claim 1 wherein step d) includes projecting images along each detected angle and searching for peaks.

5. The method as defined by claim 1 wherein step d) includes applying a variable $\tau$ propagation stage of a subspace-based line detection algorithm.

* * * * *